United States Patent
Mathieu et al.

(10) Patent No.: US 6,921,524 B2
(45) Date of Patent: Jul. 26, 2005

(54) SOLID CRYSTALLINE IM-10, AND A PROCESS FOR ITS PREPARATION

(75) Inventors: Yannick Mathieu, Colmar (FR); Jean-Louis Paillaud, Mulhouse (FR); Philippe Caullet, Illzach (FR); Nicolas Bats, Pomeys (FR); Laurent Simon, Lyons (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/792,914

(22) Filed: Mar. 5, 2004

(65) Prior Publication Data

US 2004/0220045 A1 Nov. 4, 2004

(30) Foreign Application Priority Data

Mar. 5, 2003 (FR) .............................................. 03 02735

(51) Int. Cl.[7] .............................................. C01B 39/48
(52) U.S. Cl. ....................... 423/718; 423/705; 423/708; 423/709
(58) Field of Search ................................ 423/718, 705, 423/708, 709

(56) References Cited

U.S. PATENT DOCUMENTS

| | | | | | |
|---|---|---|---|---|---|
| 3,459,676 | A | * | 8/1969 | Kerr | 502/68 |
| 4,021,331 | A | * | 5/1977 | Ciric | 208/111.15 |
| 4,309,313 | A | * | 1/1982 | Barrett et al. | 502/65 |
| 4,840,930 | A | * | 6/1989 | LaPierre et al. | 502/79 |
| 4,879,103 | A | * | 11/1989 | Vaughan | 423/705 |
| 5,098,686 | A | * | 3/1992 | Delprato et al. | 423/702 |
| 6,471,939 | B1 | | 10/2002 | Boix et al. | |

FOREIGN PATENT DOCUMENTS

WO     02 42208    5/2002

* cited by examiner

*Primary Examiner*—David Sample
(74) *Attorney, Agent, or Firm*—Millen, White, Zelano & Branigan, P.C.

(57) ABSTRACT

The invention concerns a crystalline solid, designated IM-10, which has the X ray diffraction diagram given below. Said solid has a chemical composition, expressed as the anhydrous base, in terms of moles of oxides, in accordance with the formula $XO_2:mYO_2:pZ_2O_3:qR_{2/n}O:sF$, in which R represents one or more cation(s) with valency n, X represents one or more tetravalent element(s) other than germanium, Y represents germanium, Z represents at least one trivalent element and F is fluorine.

7 Claims, 1 Drawing Sheet

SOLID CRYSTALLINE IM-10, AND A PROCESS FOR ITS PREPARATION

FIELD OF THE INVENTION

The present invention relates to a novel crystalline solid hereinafter designated IM-10 with a novel crystalline structure, and to a process for preparing said solid.

PRIOR ART

In the past few years, the search for novel microporous molecular sieves has led to the synthesis of a wide variety of that class of products. A wide variety of aluminosilicates with a zeolitic structure characterized by their chemical composition, the diameter of the pores they contain and the shape and geometry of their microporous system has been developed.

Included among the zeolites that have been synthesized over the past forty years or so, a certain number of solids have resulted in significant progress in the fields of adsorption and catalysis. Examples thereof that can be cited are Y zeolite (United States patent U.S. Pat. No. 3,130,007) and ZSM-5 zeolite (U.S. Pat. No. 3,702,886). The number of novel molecular sieves, including zeolites, that are synthesized every year is constantly increasing. A more complete description of the different molecular sieves that have been discovered can be found in the work entitled "Atlas of Zeolite Structure Types", Ch Baerlocher, W M Meier and D H Olson, Fifth Revised Edition, 2001, Elsevier. The following can be cited: NU-87 zeolite (U.S. Pat. No. 5,178,748), MCM-22 zeolite (U.S. Pat. No. 4,954,325) or CLO type gallophosphate (colverite) (U.S. Pat. No. 5,420,279), ITQ-12 (U.S. Pat. No. 6,471,939) or ITQ-13 (U.S. Pat. No. 6,471,941), CIT-5 (U.S. Pat. No. 6,043,179), and ITQ-21 (International patent application WO-A-02/092511).

Several of the zeolites cited above were synthesized in a fluoride medium, in which the mobilizing agent was not the usual hydroxide ion but the fluoride ion, using a process that was initially described by J-L Guth et al (Proc Int Zeol Conf, Tokyo, 1986, p 121). The pHs of the synthesis media were typically close to neutrality. One advantage of such fluorinated reaction systems is that they produce purely silicic zeolites containing fewer defects than zeolites obtained in the traditional OH⁻ medium (J M Chezeau et al, Zeolites, 1991, 11, 598). One other decisive advantage linked to the use of fluorinated reaction media is that they can produce novel framework topologies containing double ring units of four tetrahedra, as is the case with ITQ-7, ITQ-13, ITQ-17 zeolites. Further, the use of germanium in those synthesis media also encourages the production of such a framework in the case of ITQ-21 zeolite.

DESCRIPTION OF THE INVENTION

Figure 1:
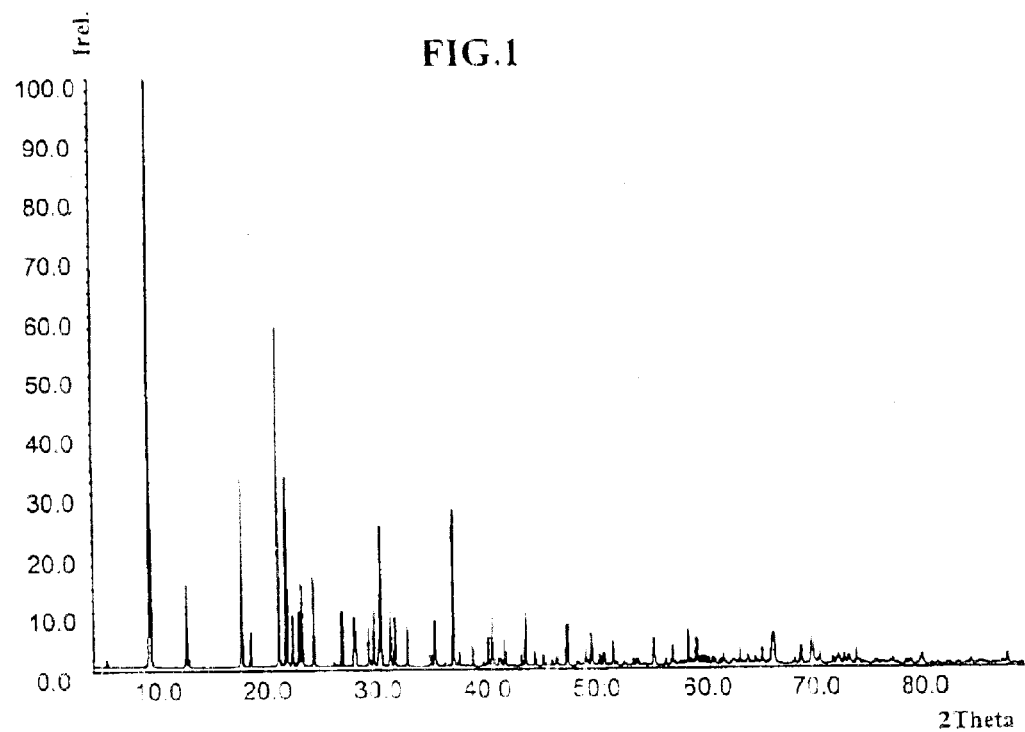

The present invention pertains to a novel crystalline solid, designated crystalline solid IM-10, and having an X ray diffraction diagram including at least the peaks shown in Table 1. This diagram is shown in FIG. 1. This novel crystalline solid IM-10 has a novel crystalline structure.

This diffraction diagram is obtained by radiocrystallographic analysis using a diffractometer using a conventional powder technique with the $K\alpha_1$ line of copper ($\lambda$=1.5406 Å). From the position of the diffraction peaks represented by the angle $2\theta$, the Bragg relationship is used to calculate the characteristic interplanar spacings $d_{hkl}$ of the sample. The error in the measurement, $\Delta(d_{hkl})$ over $d_{hkl}$, is calculated using the Bragg relationship as a function of the absolute error $\Delta(2\theta)$ made in the measurement of $2\theta$. An absolute error $\Delta(2\theta)$ of $\pm0.2°$ is usually accepted. The relative intensity $I_{rel}$ for each value of $d_{hkl}$ is measured from the height of the corresponding peak. The X ray diffraction diagram of the crystalline solid IM-10 of the invention comprises at least the peaks with the values of $d_{hkl}$ given in Table I. In the $d_{hkl}$ column, the mean values of the interplanar spacings are given in Angströms (Å). An error measurement $\Delta(d_{hkl})$ in the range $\pm0.2$ Å to $\pm0.008$ Å must be assigned to each of these values.

TABLE 1

Mean values of $d_{hkl}$ and relative intensities, measured on an X ray diffraction diagram of the crystalline solid IM-10 of the invention

| $d_{hkl}$ (Å) | 2theta (degrees) | I/I₀ |
|---|---|---|
| 14.18 | 6.23 | vw |
| 8.67 | 10.19 | VS |
| 7.07 | 12.50 | vw |
| 6.55 | 13.50 | S |
| 6.44 | 13.73 | vw |
| 5.87 | 15.09 | vw |
| 4.76 | 18.60 | mw |
| 4.55 | 19.47 | vw |
| 4.03 | 22.02 | m |
| 3.91 | 22.69 | mw |
| 3.83 | 23.20 | vw |
| 3.74 | 23.77 | vw |
| 3.69 | 24.04 | w |
| 3.54 | 25.12 | w |
| 3.30 | 26.93 | vw |
| 3.28 | 27.18 | vw |
| 3.22 | 27.68 | vw |
| 3.10 | 28.74 | vw |
| 3.08 | 28.92 | vw |
| 2.97 | 30.00 | vw |
| 2.93 | 30.46 | vw |
| 2.89 | 30.92 | vw |
| 2.88 | 31.03 | vw |
| 2.87 | 31.17 | w |
| 2.80 | 31.98 | vw |
| 2.75 | 32.47 | vw |
| 2.67 | 33.56 | vw |
| 2.52 | 35.64 | vw |
| 2.49 | 36.03 | vw |
| 2.48 | 36.20 | vw |
| 2.44 | 36.79 | vw |
| 2.43 | 36.98 | vw |
| 2.38 | 37.72 | w |
| 2.36 | 38.07 | vw |
| 2.34 | 38.31 | vw | in which
VS = very strong;
m = medium;
w = weak;
S = strong;
mw = medium weak;
vw = very weak.

The relative intensity $I/I_0$ is given with respect to a scale of relative intensity giving a value of 100 to the most intense peak in the X ray diffraction diagram: vw<15; 15≦f<30; 30≦mw<50; 50≦m<65; 65≦S<85; VS≧85.

Figure 2:
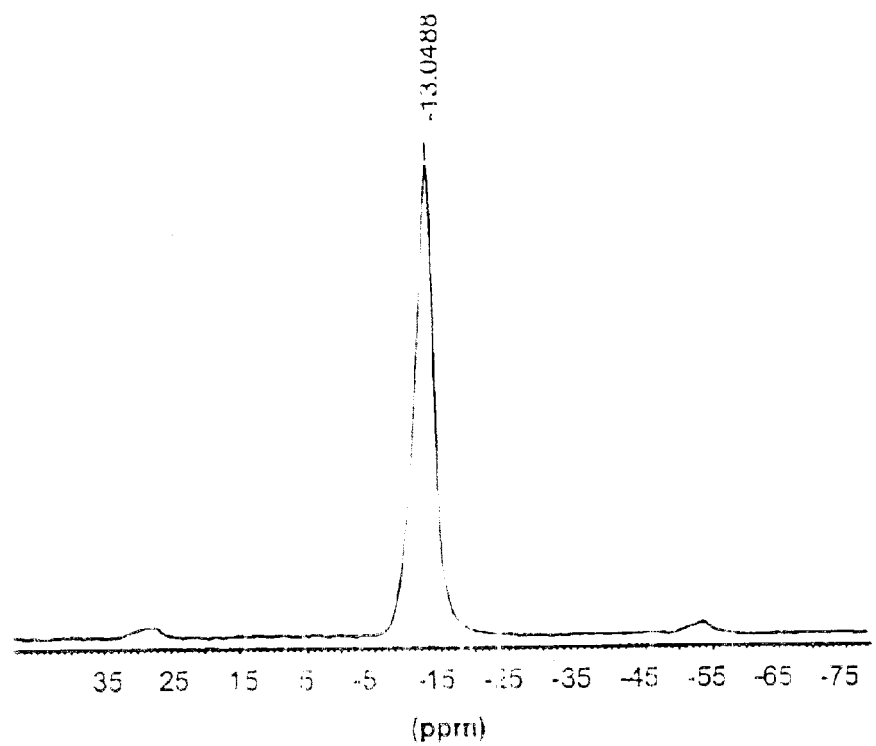

The crystalline solid IM-10 of the invention has a novel basic crystalline structure or topology which is characterized by its X ray diffraction diagram shown in FIG. 1. The novel crystalline structure of the crystalline solid IM-10 of the invention is a three-dimensional structure formed by tetrahedra. It comprises units of the "double ring unit with four tetrahedral" type, demonstrated by ¹⁹F nuclear magnetic resonance (FIG. 2). The peak of each tetrahedron is occupied by an oxygen atom. The crystalline solid IM-10 of the invention has the topology of clathrasil with cages comprising the organic template used for the synthesis of said solid IM-10. Each cage is formed from 20 rings of 6 tetrahedra and 10 rings of 4 tetrahedra [$6^{20}$, $4^{10}$]. Each ring of 4 tetrahedra is connected to a further 4-tetrahedron ring to form a double 4-tetrahedra ring (D4R) which includes a fluorine ion. Each 4-tetrahedron double ring is common to two cages.

Said solid IM-10 has a chemical composition, expressed as the anhydrous base, in terms of moles of the oxides, defined by the following general formula: $XO_2:mYO_2:pZ_2O_3:qR_{2/n}O:sF$ (I), in which R represents one or more cation(s) with valency n, X represents one or more tetravalent element(s) other than germanium, Y represents germanium, Z represents at least one trivalent element and F is fluorine. In formula (I), m, p, q, s respectively represent the number of moles of $YO_2$, $Z_2O_3$, $R_{2/n}O$ and F m, p, q and s may be zero.

Advantageously, the ratio Ge/X of the framework of the crystalline solid IM-10 of the invention is in the range 0.7 to 4, preferably in the range 0.7 to 3. Preferably, m is in the range 0.1 to 0.4, and more preferably, m is in the range 0.3 to 3. The ratio $\{(1+m)/p\}$ is 5 or more and more preferably 7 or more. The value of p is preferably in the range 0 to 0.5, highly preferably in the range 0 to 0.4, still more preferably in the range 0.01 to 0.4. The values of q and s are advantageously in the range 0.01 to 0.7, and highly advantageously in the range 0.1 to 0.5.

In accordance with the invention, X is preferably selected from silicon, tin and titanium, and Z is preferably selected from aluminium, boron, iron, indium and gallium, and highly preferably Z is aluminium. Preferably, X is silicon: the crystalline solid IM-10 of the invention is then a crystalline metallosilicate with an X ray diffraction diagram that is identical to that described in Table 1. More preferably, X is silicon and Z is aluminium: the crystalline solid IM-10 of the invention is then a crystalline aluminosilicate with an X ray diffraction diagram identical to that described in Table 1.

In the case in which the crystalline solid IM-10 of the invention is in the as synthesized form, i.e. directly from synthesis and prior to any calcining and/or ion exchange step, which steps are well known to the skilled person, said solid IM-10 comprises at least one organic nitrogen-containing cation as will be described below or its decomposition products, or its precursors. In its as synthesized form, the cation(s) R present in formula (I) is (are) at least partially, and preferably entirely, said organic nitrogen-containing cation(s). In a preferred mode of the invention, R is a cation with formula $[(H_3C)_3-N-(CH_2)_x-N-(CH_3)_3]^{2+}$ in which x is in the range 4 to 8; it is preferably the hexamethonium cation (x=6) in the case in which the crystalline solid IM-10 is in the as synthesized form. The cation $[(H_3C)_3-N-(CH_2)_x-N-(CH_3)_3]^{2+}$, in which x is in the range 4 to 8, preferably hexamethonium (x=6), acts as an organic template. Said template used during preparation of the crystalline solid IM-10, as will be described below in the description, compensates for the negative charge on the framework. The template can be eliminated using conventional prior art techniques such as heat and/or chemical treatments. In accordance with a further preferred mode of the invention, the cation $[(H_3C)_3-N-(CH_2)_x-N-(CH_3)_3]^{2+}$, in which x is in the range 4 to 8, preferably hexamethonium (x=6), is mixed with a further cation, preferably an alkali cation, for example sodium, in the case in which the crystalline solid IM-10 is in the as synthesized form.

The crystalline solid IM-10 of the invention is preferably a zeolitic solid.

The invention also concerns a process for preparing the crystalline solid IM-10 in which an aqueous mixture, comprising at least one source of at least one oxide $XO_2$, optionally at least one source of the oxide $YO_2$, optionally at least one source of at least one oxide $Z_2O_3$ and optionally at least one source of an oxide $M_{2/w}O$ and at least one organic nitrogen-containing cation R, or at least one precursor of an organic nitrogen-containing cation or at least one decomposition product of the organic nitrogen-containing cation, is reacted, the mixture generally having the following molar composition:

| | |
|---|---|
| $(XO_2 + YO_2)/Z_2O_3$ | at least 5, preferably at least 7; |
| $M_{2/w}O/(XO_2 + YO_2)$ | 0 to 3, preferably 0 to 1, and more preferably 0.01 to 1; |
| $H_2O/(XO_2 + YO_2)$ | 1 to 50, preferably 2 to 30; |
| $R/(XO_2 + YO_2)$ | 0.1 to 3, preferably 0.1 to 1; |
| $F/(XO_2 + YO_2)$ | 0.1 to 3, preferably 0.1 to 1; |
| $YO_2/XO_2$ | 0 to 1, preferably 0.5 to 1; |
| $L_aS/XO_2$ | 0 to 0.5, preferably 0 to 0.3, more preferably 0.02 to 0.3; | in which X is one or more tetravalent element(s) other than germanium, preferably silicon, Y is germanium, Z is one or more trivalent element(s) selected from the group formed by the following elements: aluminium, iron, boron, indium and gallium, preferably aluminium, M is a cation with valency w which may comprise an alkali metal and/or ammonium cation. $L_aS$ is a salt, S being an anion with valency a and L being an alkali metal or ammonium ion, which may be similar to M, or a mixture of M and a further alkali metal or ammonium ion necessary to balance the anion S, S possibly comprising an acid radical added, for example, in the form of a salt of L or an aluminium salt. The cation M used is preferably an alkali metal, in particular sodium. Examples of S that can be cited are strong acid radicals such as the bromide, chloride, iodide, sulphate, phosphate or nitrate, or weak acid radicals such as organic acid radicals, for example the citrate or the acetate. While $L_aS$ is not essential, it may accelerate crystallization of the solid IM-10 of the invention from the reaction mixture and it may also affect the size and shape of the crystals constituting the solid IM-10. In all cases, the reaction is continued until crystallization occurs.

Fluorine can be introduced in the form of salts of alkali metals or of ammonium, such as NaF, $NH_4F$, $NH_4HF_2$ or in the form of hydrofluoric acid or in the form of hydrolysable compounds which can release fluoride ions into the water, such as silicon fluoride $SiF_4$ or ammonium or sodium fluorosilicate, $(NH_4)_2SiF_6$ or $Na_2SiF_6$.

In accordance with the process of the invention, R is an organic nitrogen-containing template. Preferably, R is the organic nitrogen-containing compound $[(H_3C)_3-N-(CH_2)_x-N-(CH_3)_3]^{2+}$ in which x is in the range 4 to 8, preferably the cationic compound hexamethonium (x=6), or at least one precursor of $[(H_3C)_3-N-(CH_2)_x-N-(CH_3)_3]^{2+}$ or at least one decomposition product of $[(H_3C)_3-N-(CH_2)_x-N-(CH_3)_3]^{2+}$. Preferably, it is a hexamethonium salt such as the halide, hydroxide, sulphate, nitrate, acetate, silicate or aluminate. Preferably, the hexamethonium salt is a hydroxide. The cation M and/or the organic template can be added in the form of hydroxides or salts of mineral acids provided that the ratios $M_{2/w}O/(XO_2+YO_2)$ and $R/(XO_2+YO_2)$ are respected.

The source of element X can be any compound comprising the element X and which can liberate that element in aqueous solution in the reactive form. Advantageously, when the element X is silicon, the silicon source can be any one of those routinely used in synthesizing zeolites, for example solid powdered silica, silicic acid, colloidal silica or dissolved silica, or tetraethoxysilane (TEOS). Of the powdered silica that can be used, it is possible to use precipitated silicas, in particular those obtained by precipitation from a solution of an alkali metal silicate, such as aerosil silicas, pyrogenic silicas, for example "CAB-O-SIL", and silicon gels. It is possible to use colloidal silicas with different particle sizes, for example with a mean equivalent diameter in the range 10 to 15 nm or in the range 40 to 50 nm, such as those sold under the trade name "LUDOX", for example. Dissolved silicas that can be used also include commercially available soluble glass silicates containing 0.5 to 6.0, in particular 2.0 to 4.0 moles of $SiO_2$ per mole of alkali metal oxide, silicates of "active" alkali metals such as those defined in British patent GB-A-1 193 254, and silicates obtained by dissolving silica in an alkali metal hydroxide or a quaternary ammonium hydroxide, or a mixture thereof. Preferably, the silicon source is TEOS.

The source of element Z can be any compound comprising the element Z and which can liberate that element in aqueous solution in the reactive form. In the preferred case in which Z is aluminium, the alumina source is preferably sodium aluminate, or an aluminium salt, for example the chloride, nitrate, the hydroxide or the sulphate, an aluminium alkoxide or alumina itself, preferably in the hydrated or hydratable form, such as colloidal alumina, pseudoboehmite, gamma alumina or an alpha or beta trihydrate. It is also possible to use mixtures of the sources cited above.

Some or all of the sources of alumina and silica can optionally be added in the form of the aluminosilicate.

The source of element Y can, for example, be germanium oxide $GeO_2$.

In a preferred implementation of the process of the invention, an aqueous mixture comprising silica, alumina, a germanium oxide, hydrofluoric acid and hexamethonium hydroxide is reacted.

The process of the invention consists of preparing an aqueous reaction mixture termed a gel and comprising at least one source of at least one oxide $XO_2$, optionally at least one source of the oxide $YO_2$, optionally at least one source of at least one oxide $Z_2O_3$, optionally at least one source of an oxide $M_{2/w}O$ and at least one organic nitrogen-containing cation R, or at least one precursor of an organic nitrogen-containing cation or at least one decomposition product of an organic nitrogen-containing cation. The quantities of said reagents are adjusted to endow said gel with a composition that allows it to crystallize into the crystalline solid IM-10 with formula $XO_2:mYO_2:pZ_2O_3:qR_{2/n}O:sF$, in which m, p, q, n and s satisfy the criteria defined above. The gel then undergoes a hydrothermal treatment until the crystalline solid IM-10 is formed. The gel is advantageously subjected to hydrothermal conditions under autogenous reaction pressure, optionally adding a gas, for example nitrogen, at a temperature in the range 120° C. to 200° C., preferably in the range 140° C. to 180° C., and more preferably at a temperature that does not exceed 175° C. until the crystals of solid IM-10 of the invention are formed. The time required to obtain crystallization generally varies between 1 hour and several months, depending on the composition of the reagents in the gel, the stirring rate and the reaction temperature. The reaction is generally carried out with stirring or in the absence of stirring, preferably in the presence of stirring.

It may be advantageous to add seeds to the reaction mixture to reduce the time required to form nuclei and/or the total crystallization time. It may also be advantageous to use seeds to encourage the formation of crystalline IM-10 to the detriment of impurities. Said seeds comprise crystalline solids, in particular crystals of solid IM-10. The crystalline seeds are generally added in a proportion in the range 0.01% to 10% by weight of the oxide $XO_2$, preferably silica, used in the reaction mixture.

At the end of the reaction, the solid phase is filtered and washed; it is then ready for subsequent steps such as drying, dehydration and calcining and/or ion exchange.

The invention will be illustrated by the following examples.

EXAMPLE 1

4.257 g of an aqueous 15.4% solution of hexamethonium hydroxide (ROH) and 1.16 g of tetraethoxysilane (Aldrich) were poured into a polypropylene beaker. After dissolving the tetraethoxysilane with stirring, 0.58 g of amorphous germanium oxide (Aldrich) was added. The ethanol and excess water were evaporated off at ambient temperature and with stirring until a mass of 1.83 g was reached. 0.28 g of 40% by weight hydrofluoric acid in water (Fluka) was added and it was stirred until a homogeneous paste was formed. The gel was then transferred into a Teflon liner then the liner was placed in a 20 millilitre autoclave.

The molar composition of the gel was $0.5SiO_2:0.5GeO_2:0.25ROH:0.5HF:5H_2O$.

The autoclave was heated in an oven for 7 days at 170° C. During synthesis, the autoclave was stirred constantly, the longitudinal axis of the autoclave rotating at a speed of about 15 rpm in a plane perpendicular to the axis of rotation. The pH of the synthesis was close to 9. After filtering, the product was washed with distilled water and dried at 70° C. The dry solid product was analyzed by powder X ray diffraction and identified as being constituted by the solid IM-10. The diffractogram recorded for the as synthesized sample is shown in FIG. 1. Chemical analysis of the product by X ray fluorescence was carried out and produced a $SiO_2/GeO_2$ ratio of 0.33.

EXAMPLE 2

4.257 g of an aqueous 15.4% solution of hexamethonium hydroxide (ROH) in water was poured into a polypropylene beaker. 0.0260 g of aluminium hydroxide (Aldrich) (64.5%–67% by weight of $Al_2O_3$) and 0.58 g of amorphous germanium oxide (Aldrich) were added. After dissolving the oxides with stirring, 1.16 g of tetraethoxysilane was added. The ethanol and excess water were evaporated off at ambient temperature and with stirring until a mass of 1.78 g was reached. After evaporation, 0.28 g of 40% by weight hydrofluoric acid in water (Fluka) was added. After waiting for 20 minutes, it was stirred manually until a homogeneous paste was formed. The gel was then transferred into a Teflon liner, then the liner was placed in a 20 millilitre autoclave.

The molar composition of the gel was as follows:
$0.5SiO_2:0.5GeO_2:0.01Al_2O_3:0.25ROH:0.5HF:5H_2O$.

The autoclave was heated in an oven for 7 days at 170° C. under agitated conditions. During synthesis, the autoclave was continuously stirred, the longitudinal axis of the autoclave rotating at a speed of about 15 rpm in a plane perpendicular to the axis of rotation. After filtering, washing with distilled water and drying at 70° C., 300 mg of product was obtained. The dry solid product was analyzed by powder X ray diffraction and identified as being constituted by the solid IM-10. The diffractogram recorded for the as synthesized sample is shown in FIG. 1.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding French application No.03/02.735, filed Mar. 5, 2003, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A crystalline solid IM-10 with an X ray diffraction diagram including at least the peaks listed in the table below:

| $d_{hkl}$ (Å) | 2theta (degrees) | $I/I_0$ |
|---|---|---|
| 14.18 | 6.23 | vw |
| 8.67 | 10.19 | VS |
| 7.07 | 12.50 | vw |
| 6.55 | 13.50 | S |
| 6.44 | 13.73 | vw |
| 5.87 | 15.09 | vw |
| 4.76 | 18.60 | mw |
| 4.55 | 19.47 | vw |
| 4.03 | 22.02 | m |
| 3.91 | 22.69 | mw |
| 3.83 | 23.20 | vw |
| 3.74 | 23.77 | vw |
| 3.69 | 24.04 | w |
| 3.54 | 25.12 | w |
| 3.30 | 26.93 | vw |
| 3.28 | 27.18 | vw |
| 3.22 | 27.68 | vw |
| 3.10 | 28.74 | vw |
| 3.08 | 28.92 | vw |
| 2.97 | 30.00 | vw |
| 2.93 | 30.46 | vw |
| 2.89 | 30.92 | vw |
| 2.88 | 31.03 | vw |
| 2.87 | 31.17 | w |
| 2.80 | 31.98 | vw |
| 2.75 | 32.47 | vw |
| 2.67 | 33.56 | vw |
| 2.52 | 35.64 | vw |
| 2.49 | 36.03 | vw |
| 2.48 | 36.20 | vw |
| 2.44 | 36.79 | vw |
| 2.43 | 36.98 | vw |
| 2.38 | 37.72 | w |

-continued

| $d_{hkl}$ (Å) | 2theta (degrees) | $I/I_0$ |
|---|---|---|
| 2.36 | 38.07 | vw |
| 2.34 | 38.31 | vw | in which VS=very strong; m=medium; w=weak; S=strong; mw=medium weak;

vw=very weak, and having a chemical composition, expressed as the anhydrous base in terms of the moles of oxides, defined by the following general formula: $XO_2:mYO_2:pZ_2O_3:qR_{2/n}O:sF$ (I), in which R represents one or more cation(s) with valency n, X represents one or more tetravalent element(s) other than germanium, Y represents germanium, Z represents at least one trivalent element and F is fluorine, m, p, q, s respectively representing the number of moles of $YO_2$, $Z_2O_3$, $R_{2/n}O$ and F and m is in the range 0.1 to 4, p is in the range 0 to 0.5, q and s are in the range 0.01 to 0.7, the ratio $\{(1+m)/p\}$ being 5 or more.

2. A crystalline solid IM-10 according to claim 1, in which X is silicon.

3. A crystalline solid IM-10 according to claim 1, in which Z is aluminium.

4. A process for preparing a crystalline solid IM-10 in accordance with claim 1, consisting of mixing at least one source of at least one oxide $XO_2$, optionally at least one source of an oxide $YO_2$, optionally at least one source of at least one oxide $Z_2O_3$, optionally at least one source of an oxide $M_{2/w}O$ and at least one organic nitrogen-containing cation R or at least one precursor of an organic nitrogen-containing cation or at least one decomposition product of an nitrogen-containing organic cation, then carrying out a hydrothermal treatment on said mixture until said crystalline solid IM-10 is formed.

5. A process for preparing a crystalline solid IM-10 according to claim 4, in which the molar composition of the reaction mixture is such that:

| | |
|---|---|
| $(XO_2 + YO_2)/Z_2O_3$ | at least 5; |
| $M_{2/w}O/(XO_2 + YO_2)$ | 0 to 3; |
| $H_2O/(XO_2 + YO_2)$ | 1 to 50; |
| $R/(XO_2 + YO_2)$ | 0.1 to 3; |
| $F/(XO_2 + YO_2)$ | 0.1 to 3; |
| $YO_2/XO_2$ | 0 to 1; |
| $L_aS/XO_2$ | 0 to 0.5. |

6. A preparation process according to claim 4, in which R is the hexamethonium cation $[(H_3C)_3—N—(CH_2)_6—N—(CH_3)_3]^{2+}$.

7. A process according to claim 4, in which seeds are added to the reaction mixture.

* * * * *